Patented Dec. 6, 1927.

1,651,733

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

NONDUSTING CARBON PIGMENT AND PROCESS OF MAKING THE SAME.

No Drawing. Application filed November 26, 1926. Serial No. 151,011.

This invention relates to non-dusting carbon pigments and processes of making the same. One of the objects of this invention is to provide carbon pigments in such a state that they do not tend to produce annoying or dangerous clouds of carbon dust and yet may be mixed especially readily into compositions without substantial loss of covering power. Another object of the invention is to provide simple and relatively inexpensive processes for producing such pigments.

Carbon pigments, such as lampblack, gas black and other forms of carbon black, ivory black, etc., are desirable ingredients in many compositions, because of the fact that they are fine grained, permanent and of great covering power. But in certain industries their use has lead to considerable difficulties. If dust from these pigments mixes with the air in proper proportions, an explosive mixture is obtained which is highly dangerous. Moreover, this dust is liable to contaminate mixtures into which it is undesirable to have it enter. Furthermore, it has been difficult to incorporate such pigments into certain kinds of compositions.

We have found that such carbon pigments, even the extremely fine-grained gas blacks, may be brought into substantially non-dusting form by associating with or adsorbing on each particle of carbon a minute amount of a waxy substance, including, for example, various kinds of mineral, animal and vegetable waxes, oils or higher fatty acids. We have also found that the simplest process for associating the waxy substances and the carbon particles is to mix the latter with the waxy substances while they are carried by liquids, the liquids being preferably volatile and removed to leave the waxy substances coated over each of the carbon particles.

We shall now describe several examples of our invention, but it will be understood that the latter is not limited to the details thus given, except as indicated in the appended claim. 75 parts by weight of paraffin wax and 25 parts of beeswax are dissolved in 2000 parts of benzol. 2000 parts by weight of carbon black, such as a fine gas black, are thoroughly stirred into this liquid. The benzol is then evaporated off and the dried solids constitute a carbon pigment which is non-dusting when treated with ordinary caution.

In another example of our invention, 75 parts by weight of paraffin wax and 25 parts of oleic acid are dissolved in 2000 parts of benzol, into which 2000 parts of the carbon pigment are mixed. The benzol is then removed, leaving the non-dusting pigment.

The evaporation of the benzol, and its recovery, say by condensation, can take place in convenient or preferred apparatus customarily used for such a recovery. Moreover, the separation of the benzol, or equivalent volatile solvent liquid can be hastened by centrifuging the mixture of carbon pigment in the solution of the waxy substances. In this way the bulk of the benzol is separated mechanically, and it is only necessary to evaporate off the residue of benzol in the carbon particles collected by centrifuging.

The proportions of the ingredients can vary widely without departing from our invention. For example, we may mix 2000 parts by weight of the carbon pigment in 8000 parts of benzol containing 150 parts of paraffin wax and 50 parts of either beeswax or oleic acid. This can be centrifuged as above mentioned.

In a still further example of our invention, we may dissolve 10 parts by weight of either castor oil, or lard oil, or cocoanut oil, or fish oil, or vaseline, or mineral oil, in 400 parts by weight of benzol. Into any of the solutions thus formed, we thoroughly stir 200 parts by weight of the carbon pigment to be treated. The particles of the carbon pigment, coated with the waxy substances, may be then separated from the liquid by the steps hereinabove explained.

Instead of using a volatile solvent of the waxy substances as the liquid vehicle for carrying them into contact with the pigment, we may even employ a non-solvent of the waxy substances. In this case the waxy substances are thoroughly emulsified in the non-solvent liquid and then the pigment is mixed into the emulsion. After allowing a brief time for the particles of pigment and wax to come into contact and join together, probably by adsorption, the emulsion is preferably centrifuged, and the residue of liquid evaporated from the separated solids. For example, 100 parts by weight of carnauba wax are emulsified in 4000 parts by weight of water containing 1 part of alkali, such as caustic soda. Where the waxes are not saponified by the small amounts of alkali, the emulsification can be helped by substituting 6 parts of soap in the above described emulsion. The formation of the emulsion follows well known emulsifying procedures, intensive agitation, jets and high-speed colloid mills being illustrative of the different expedients which may be used.

The pigment is stirred into the above described emulsion, allowed to stand for about 30 minutes, and then centrifuged and the product dried, as above described.

In another example, 10 parts by weight of either oleic acid or cocoanut oil are emulsified in 800 parts by weight of water containing 2 parts of NAOH. Into the emulsified aqueous liquid there are thoroughly stirred 200 parts by weight of the carbon pigment to be treated. Then the emulsion is allowed to stand, say for about one-half hour, and finally filtered or centrifuged to obtain the treated carbon. The liquid may be mildly heated and then cooled prior to separating out the pigment, if desired.

We have found that carbon pigments treated with waxy substances, in accordance with our invention, enter into customary compositions as readily as before our treatment. In some cases they enter even more readily into admixture with the other ingredients. For example, where carbon black is to be incorporated with rubber, such as plantation crepe, mechanically, say in a well known rubber "mixing mill," our treatment of the pigment noticeably facilitates the compounding operation, as well as removes the danger and trouble from excessive dust. The pigment treated by our process is likewise readily miscible in various kinds of lacquers, as will be readily understood by those skilled in the art of using carbon black in the paint and varnish industry. Where the pigment is to be dispersed into the form of an emulsion, our product, coated with waxy substances, can be readily dispersed to obtain a colloidal liquid. In other words, while our treatment causes the particles in our product to cling together sufficiently to avoid dusting, it, nevertheless, does not bind them together in such a way that they interfere with admixture into other forms.

In place of the waxes and fatty acids hereinabove mentioned, the following may be employed, although our invention is not in any way restricted to these illustrations.—

Animal oils and fats, such as neat's-foot oil, stearin and wool grease; vegetable oils, such as corn and soya; petroleum oils, either crude or refined, as also petroleum greases.

Having thus described our invention, what we claim as new and desire to secure by Letters Patent is:

A non-dusting carbon pigment, the particles of which are associated with a wax which is solid at room temperature and restrains the particles from dusting and yet permits them to be readily mixed into compositions with compatible ingredients, the size of the particles being such as to cause dusting in the absence of said wax.

Signed at Rochester, New York, this 19th day of November, 1926.

SAMUEL E. SHEPPARD.
LEON W. EBERLIN.